United States Patent [19]
Justen

[11] 3,807,674
[45] Apr. 30, 1974

[54] CONTAINER HOLDER
[76] Inventor: Charles D. Justen, 7921 W. 78th St., Bloomington, Minn. 55438
[22] Filed: Dec. 15, 1972
[21] Appl. No.: 315,531

[52] U.S. Cl. .............................................. 248/311
[51] Int. Cl............................................ F16m 13/00
[58] Field of Search........ 248/214, 215, 226 B, 295, 248/298, 311; 287/58 R; 108/46

[56] References Cited
UNITED STATES PATENTS

| | | | |
|---|---|---|---|
| 2,879,023 | 3/1959 | Barrier et al..................... | 248/311 X |
| 502,011 | 7/1893 | Paumgarten-Frauenstein .... | 248/298 |
| 1,772,176 | 8/1930 | Benjamin........................ | 248/214 X |
| 3,267,880 | 8/1966 | Bedol................................ | 108/46 |
| 1,045,932 | 12/1912 | Beckwith........................... | 248/298 |

*Primary Examiner*—William H. Schultz
*Attorney, Agent, or Firm*—Merchant, Gould, Smith & Edell

[57] ABSTRACT

A holder for supporting beverage containers adjacent the inside door panel and window of an automobile is shown. A handle is provided, having a horizontal, extendable portion, and a downwardly extending outer portion adapted to slide between the door panel and window to hold the unit in place. The handle is formed from two members which are clamped together by a releasable cam member so that the length of the horizontally extending portion can be changed as desired.

7 Claims, 4 Drawing Figures

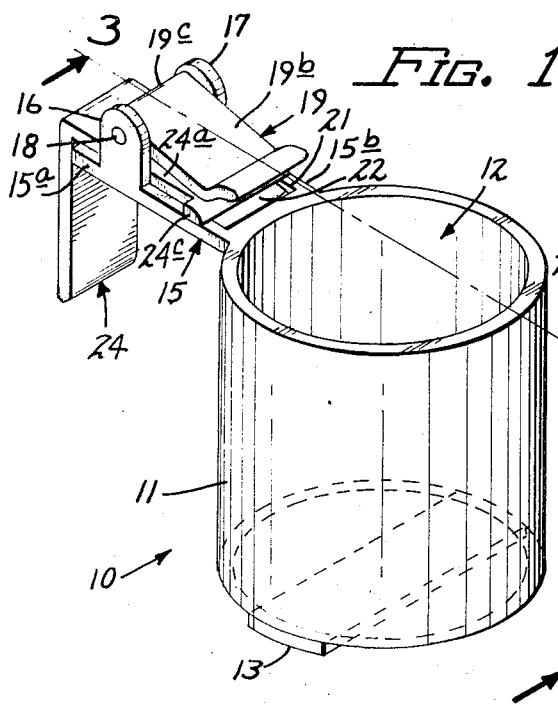
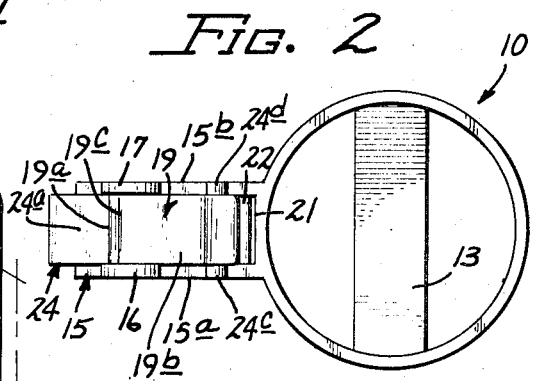
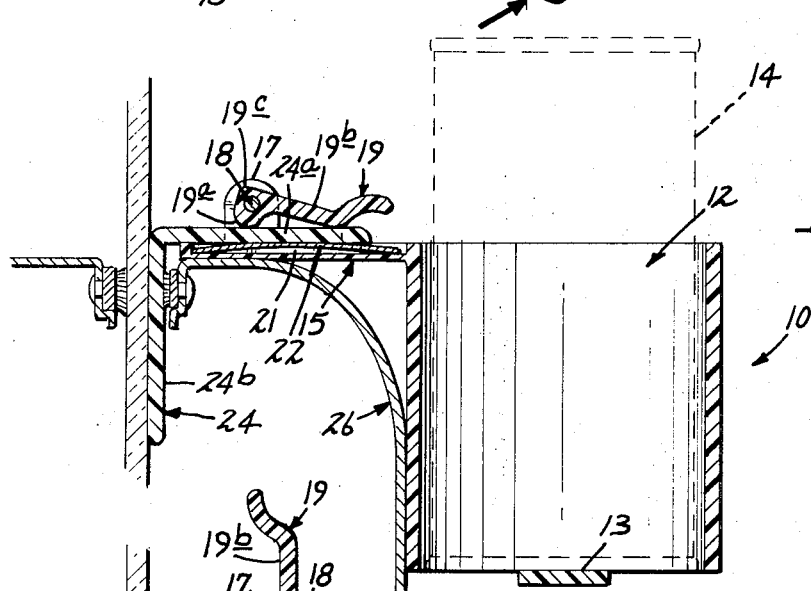
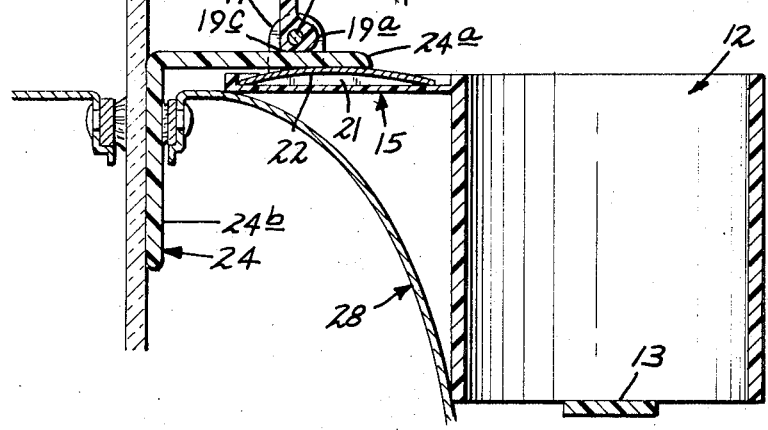

CONTAINER HOLDER

BACKGROUND OF THE INVENTION

1. Field of the Invention

This invention relates generally to the construction of a beverage container holder for vehicles, and more particularly relates to a holder having means for adjusting the handle length thereof for supporting containers adjacent the inside door panel of an automobile.

2. Description of the Prior Art

The general concept of providing a bottle, cup or can holder for use in automobiles or other vehicles is not new. Many devices have been designed for this general purpose. These devices typically include a container holding portion which is supported along the inside door panel by a downwardly extending hook member which can be inserted between the door panel and window. In many cases, the inside wall of the container holder and the hook-forming handle member form generally an inverted U-shaped device which fits over the door panel. Unfortunately, because the door panels of different vehicles are of different thicknesses, the device must be designed to accommodate the thickest door panel. In other words, the hook portion must be spaced from the container holding portion by a laterally extending portion a sufficient distance to accommodate all potential door panel thicknesses. However, this means that if the device is used on an automobile having a very thin door panel, the door panel does not offer adequate support for the holder. Instead of remaining level, the container holding portion will bend downwardly until it comes to rest against the door panel, and will thus not hold the container in a level position. Further, if the handle is longer than necessary, the unit will protrude into the vehicle an undesirable distance thereby becoming subject to accidental tipping. A device of this kind is most secure and useful if it fits snugly over the door panel for support thereby. Typical examples of prior art devices having this drawback are shown in the Sebring U.S. Pat. No. 2,215,411, issued Sept. 17, 1940; the Skirrow U.S. Pat. No. 1,915,958, issued June 27, 1933; and the Fazakerley U.S. Pat. No. 2,628,054, issued Feb. 10, 1953.

SUMMARY OF THE INVENTION

The present invention includes a tubular container carrier having a two-part handle member. A first handle member extends horizontally outwardly from the top of the container. A second, L-shaped handle member has a first portion overlying the first handle member and a second portion which extends downwardly for insertion between the window and door panel. A pair of spaced flanges extend upwardly from the first handle member on opposite sides of the other handle member, and a cam member is rotatably mounted between the spaced flanges. The cam member can be rotated between a position in which it locks the two handle members together and a position in which the two handle members are released for adjustment thereof. By releasing the cam member, the distance between the downwardly extending second portion and the side wall of the container portion can be changed so that the unit will fit snugly over a wide range of thicknesses of door panels. The side wall of the container carrier portion can thus be made to rest snugly against the inside door panel for support thereby, and to keep the container as close to the door panel as possible to prevent accidental spilling thereof.

This device can be used to hold cans, bottles, cups or glasses in any car or truck. No complicated installation is required and any person can easily adjust the extendable handle. The device can be manufactured from either metal or plastic, in a wide variety of colors to match the interior color of the vehicle. These and other advantages of the present invention will become apparent from the following description of the preferred embodiment.

BRIEF DESCRIPTION OF THE DRAWINGS

FIG. 1 is a view in perspective of a beverage container holder with adjustable handle according to my invention;

FIG. 2 is a top plan view thereof;

FIG. 3 is a sectional side view taken along line 3—3 of FIG. 1, showing the holder mounted on the inside door panel of a typical automobile; and FIG. 4 is a view similar to FIG. 3, showing the holder being adjusted for mounting on a thicker door panel.

DESCRIPTION OF THE PREFERRED EMBODIMENT

Referring now to the drawings, wherein like reference numerals are used throughout the several views to indicate like elements of the invention, there is disclosed in FIG. 1 a beverage container holder which includes a tubular container carrier 10 having a container encircling side wall member 11 with an open top end 12. Attached to the bottom end of carrier 10 is a base member 13 which is adapted to support a container 14 as shown in FIG. 3. Extending outwardly from side wall 11 adjacent the upper end thereof is a first plate-like handle member 15. Handle member 15 is a rectangular member having opposite, parallel side edges 15a, 15b. One end of handle member 15 is attached to side wall 11 and the other free end is spaced therefrom. First handle member 15 extends outwardly from side wall 11 in a plane generally perpendicular to the longitudinal axis of the cylindrical container carrier 10.

Extending upwardly from the side edges 15a, 15b are a pair of spaced, parallel flanges 16 and 17. A pivot pin 18 extends over the top of first handle member 15 through suitable openings formed in flanges 16 and 17. A generally L-shaped cam member 19 is provided, having two legs, with one leg forming a cam portion 19a and the other leg forming an elongated handle portion 19b. Pin 18 extends through an opening in the vertex 19c of the cam member 19. Cam member 19 is manually rotatable between a locking position, shown in FIG. 3, in which the cam portion 19a extends downwardly toward first handle member 15, and a release position, shown in FIG. 4, in which the cam portion 19 extends generally parallel to the top surface of first handle member 15.

A generally rectangular, box-like depression 21 is formed in the top surface of first handle member 15 between flanges 16 and 17. In the preferred embodiment of the invention as shown in the drawings, the depression 21 extends substantially the full length of first handle member 15. Mounted in depression 21 is a rectangular, thin, leaf-type spring member 22. The opposite ends of spring member 22 engage the opposite ends of the bottom surface of depression 21, and the center of spring member 22 bows upwardly therefrom.

A second, generally L-shaped handle member 24 is provided having a first plate-like portion 24a and a second plate-like portion 24b extending perpendicular thereto. First portion 24a is positioned directly above first handle member 15 and above spring member 22, but below cam member 19. First portion 24a also extends between flanges 16 and 17. Spring member 22 biases first portion 24a upwardly against cam member 19. Second portion 24b extends downwardly over the outer end of first handle member 15 so that it can be inserted into the space between a door panel 26 and window 27, as shown in FIG. 3.

To prevent accidental separation of the handle members 15 and 24, the free end of first portion 24a is provided with a pair of laterally extending tabs 24c, 24d which extend behind the flanges 16 and 17. In the preferred embodiment, the tabs extend to positions even with the side edges 15a and 15b of first handle member 15. Thus, if cam member 19 is accidentally released, the handle members cannot accidentally separate because the tabs 24c, 24d will engage the flanges 16 and 17.

Actually, it is not likely that the cam member 19 will accidentally release from the locked position shown in FIG. 3 because the cam portion 19a passes through the vertical position, over center, to reach the locked position. In order to release the cam member 19, the cam member must be rotated in a counterclockwise direction as viewed in FIG. 3 through the over-center position in order to reach the release position shown in FIG. 4. This makes it unlikely that the cam member 19 will accidentally release.

In FIG. 3, the unit is shown mounted on a door panel 26 which is relatively thin. Therefore, the handle members 15 and 24 are overlapped to substantially their shortest overall length so that the side wall member 11 fits snugly against the vertical interior surface of the door panel 26. The container carrier 10 is thus held in an upright position to securely hold the can 14. There is no tendency for the carrier 10 to tip downwardly or to twist to the side because the unit is supported both by the downwardly extending second portion 24b and the wall panel 26. Further, the entire unit protrudes into the car interior the shortest possible distance so as to reduce the likelihood of accidental contact therewith and resultant spilling. In FIG. 4, the apparatus is shown as it is being adjusted to fit a door panel 28 which is considerably thicker than door panel 26. Because of the thicker door panel 28, the distance between second portion 24b and side wall member 11 must be increased. To accomplish this, the cam member 19 is moved to the release position and the horizontally extending first portion 24a and first handle member 15 are moved outwardly with respect to each other to increase the effective length thereof. When the desired length is achieved, the cam member 19 is again rotated in a clockwise direction to lock the handle members together as shown in FIG. 3. The overall result of the present invention is to provide a container holder which is more secure and less susceptible to accidental spilling than any device heretofore provided for the same general purpose.

It is noted that the extendable handle of the present invention can be manufactured and used without the spring member 22 and depression 21. However, this would require greater precision with respect to the distance between cam member 19 and the first handle member 15, and the thickness of first portion 24a, in order to insure a tight fit when locked. Further, any wear of the parts would result in loosening of the lock. The use of spring member 22 insures a tight lock regardless of wear or slight changes in sizes of the parts.

What is claimed is:

1. A holder, having means for adjusting the handle length thereof, for supporting containers adjacent the inside door panel of an automobile, comprising:
   a. a container carrier including a tubular side wall member with an open top end and a container supporting base member;
   b. a first plate-like handle member, having opposite side edges, attached at one end to said side wall adjacent said open top end, and extending outwardly therefrom in a plane generally perpendicular to a longitudinal axis of said tubular side wall member;
   c. a pair of spaced parallel flanges extending upwardly from said first handle member along said opposite side edges thereof;
   d. a cam member rotatably mounted between said flanges;
   e. a generally rectangular, box-like depression formed in a top surface of said first handle member between said flanges;
   f. a spring member mounted in said depression;
   g. a second L-shaped handle member having first and second plate-like portions, said first portion extending between said first handle member and said cam member and between said flanges, and said second portion extending downwardly for attachment over said door panel; and
   h. said cam member having a cam portion engaging a top surface of said first portion of said second handle member in a locking position in which said cam portion holds said first portion adjacent said first handle member against the bias of said spring member, and said cam member being rotatable to a release position in which said first portion is forced away from said first handle member by said spring member to permit adjustment thereof with respect to said first handle member to change the distance between said second portion of said second handle member and said tubular side wall member.

2. The apparatus of claim 1 wherein laterally extending tabs are provided on a free end of said first portion of said second handle member, said tabs extending behind said flanges to prevent accidental separation of said handle members.

3. A holder, having means for adjusting the handle length thereof, for supporting containers adjacent the inside wall panel and window of an automobile, comprising:
   a. a container carrier including a container encircling side wall member with an open top end and a container supporting base member;
   b. a first handle member attached at one end to said side wall and extending outwardly therefrom generally perpendicular thereto;
   c. a pair of spaced flanges extending upwardly from said first handle member;
   d. a cam member rotatably mounted between said flanges, said cam member having a cam portion manually rotatable over center between a locking position and a release position;

e. a second handle member having first and second portions, said first portion extending between said first handle member and said cam member and between said flanges, and said second portion extending downwardly for attachment over said door panel between the door panel and window; and f. said cam member having said cam portion engaging a top surface of said first portion of said second handle member in said locking position to hold said first portion against said first handle member to prevent relative movement therebetween, and said cam portion in said release position permitting said first portion to move with respect to said first handle member to permit adjustment of the distance between said second portion of said second handle member and said side wall member to accommodate different wall panel thicknesses.

4. The apparatus of claim 3 wherein said cam member is a generally L-shaped member having two legs joined at a vertex, mounted for rotation about said vertex, with one leg forming said cam portion to engage a top surface of said first portion of said second handle member, and the other leg forming an elongated handle portion, said cam member being manually rotatable between said locking position in which said cam portion extends downwardly toward said first handle member and said release position in which said cam portion extends generally parallel to said first portion of said second handle member.

5. The apparatus of claim 3 wherein spring means are mounted between said first portion of said second handle member and said first handle member to bias said members apart.

6. The apparatus of claim 5 wherein a depression is formed in said first handle member to house said spring means.

7. A holder for supporting containers adjacent a window and door panel of a vehicle, comprising:

a. a container carrier having an outwardly extending, plate-like, first handle member with opposite side edges, and a pair of spaced flanges extending upwardly above said side edges;

b. a second handle member having a first portion positioned adjacent said first handle member and extending between said flanges, and a second portion extending downwardly therefrom for insertion between the window and door panel;

c. means for releasably locking said first portion of said second handle member to said first handle member to permit adjustment of the distance between said second portion of said second handle member and said container carrier to thereby accommodate different thicknesses of door panels;

d. said means for releasably locking said handle members including a cam member rotatably mounted between said flanges for selectively locking said first portion of said second handle member against said first handle member, said first portion extending between said cam member and said first handle member; and e. a free end of said first portion of said second handle member having laterally extending tabs which extend behind said pair of flanges to prevent accidental withdrawal of said second handle member from between said flanges.

* * * * *